US011866252B2

(12) United States Patent
Chang

(10) Patent No.: US 11,866,252 B2
(45) Date of Patent: Jan. 9, 2024

(54) GARBAGE CAN PROVIDED WITH AIRTIGHT MEANS FOR PREVENTING ODOR LEAKAGE

(71) Applicants: JANIBELL, INC., Rancho Cucamonga, CA (US); Kwang Ok Chang, Seoul (KR)

(72) Inventor: Kwang Ok Chang, Seoul (KR)

(73) Assignees: JANIBELL, INC., Rancho Cucamonga, CA (US); Kwang Ok Chang, Seoul (KR)

( * ) Notice: Subject to any disclaimer, the term of this patent is extended or adjusted under 35 U.S.C. 154(b) by 304 days.

(21) Appl. No.: 17/291,173

(22) PCT Filed: Nov. 7, 2019

(86) PCT No.: PCT/KR2019/015071
§ 371 (c)(1),
(2) Date: May 4, 2021

(87) PCT Pub. No.: WO2020/096375
PCT Pub. Date: May 14, 2020

(65) Prior Publication Data

US 2021/0362945 A1 Nov. 25, 2021

(30) Foreign Application Priority Data

Nov. 8, 2018 (KR) ........................ 10-2018-0136543
Nov. 8, 2018 (KR) ........................ 10-2018-0136546

(51) Int. Cl.
*B65D 25/18* (2006.01)
*B65F 1/06* (2006.01)
(Continued)

(52) U.S. Cl.
CPC ............ *B65F 1/068* (2013.01); *B65F 1/1415* (2013.01); *B65F 1/1607* (2013.01); *B65F 2001/1676* (2013.01)

(58) Field of Classification Search
CPC .......... B65F 1/06; B65F 1/068; B65F 1/1421; B65F 1/1452; B65F 1/1415; B65F 1/1607; B65F 1/163; B65F 2001/1676
(Continued)

(56) References Cited

U.S. PATENT DOCUMENTS 4,748,905 A * 6/1988 Langdon .................. B65F 1/06 53/107
5,655,680 A * 8/1997 Asbach ..................... B65F 7/00 220/254.1
7,992,742 B1 * 8/2011 Kim ........................ B65F 1/163 220/495.08
8,752,723 B2 * 6/2014 Lucas ..................... B65F 1/062 220/495.07
(Continued)

FOREIGN PATENT DOCUMENTS

CN 205602506 9/2016
JP 05092801 4/1993
(Continued)

OTHER PUBLICATIONS

International Search Report—PCT/KR2019/015071 dated Feb. 19, 2020.

*Primary Examiner* — John K Fristoe, Jr.
*Assistant Examiner* — Elizabeth J Volz
(74) *Attorney, Agent, or Firm* — CANTOR COLBURN LLP

(57) ABSTRACT

A garbage can provided with an airtight means for preventing odor leakage is provided. In the garbage can, an inner basket covered with a garbage bag is raised and pressurized so that an upper end of the inner basket is in close contact
(Continued)

with an airtight part of an upper cap, thereby preventing garbage odors from leaking via a gap between the upper cap and the inner basket, and also the basket is automatically raised and lowered by simply opening and closing a side cover without any separate operation by a user, thereby increasing convenience.

5 Claims, 10 Drawing Sheets

(51) Int. Cl.
*B65F 1/14* (2006.01)
*B65F 1/16* (2006.01)

(58) Field of Classification Search
USPC ............ 220/263, 495.11, 495.08, 908, 908.1
See application file for complete search history.

(56) References Cited

U.S. PATENT DOCUMENTS

| | | | | |
|---|---|---|---|---|
| 10,450,133 | B2 * | 10/2019 | Chen | B65F 1/062 |
| 11,535,449 | B2 * | 12/2022 | Yang | B65F 1/163 |
| 2005/0217214 | A1 * | 10/2005 | Richardson | B65B 67/1277 53/567 |
| 2021/0155405 | A1 * | 5/2021 | Wei | B65F 1/068 |

FOREIGN PATENT DOCUMENTS

| | | |
|---|---|---|
| JP | 08244905 | 9/1996 |
| KR | 19950006934 | 6/1995 |
| KR | 100941963 | 2/2010 |
| KR | 2020100006760 | 7/2010 |
| KR | 20140115770 | 10/2014 |
| KR | 101474995 | 12/2014 |
| KR | 20170054374 | 5/2017 |
| KR | 101772615 | 8/2017 |

* cited by examiner

GARBAGE CAN PROVIDED WITH AIRTIGHT MEANS FOR PREVENTING ODOR LEAKAGE

TECHNICAL FIELD

The present invention relates to a garbage can provided with an airtight means for preventing odor leakage, wherein an inner basket covered with a garbage bag is raised and pressurized so that an upper end of the inner basket is in close contact with an airtight part of an upper cap, thereby preventing garbage odors from leaking via a gap between the upper cap and the inner basket, and also the basket is automatically raised and lowered by simply opening and closing a side cover without any separate operation by a user, thereby increasing convenience.

BACKGROUND ART

Korean Patent No. 10-1772615 relates to a garbage can having a structure in which odors are prevented by means of ultraviolet sterilization and automatic opening and closing of a cover of the garbage can, so as to promote a hygienic environment and convenience of use.

The garbage can of the above registered Korean Patent is configured to include: an outer case having an open upper side thereof; a cover coupled to an upper part of the outer case so as to be opened and closed and be made airtight with the upper part of the case; a sterilization means installed on the cover for sterilization and deodorization by generating ultraviolet rays and ozone toward an inner space of the case; an opening and closing means for automatically opening and closing the cover by detecting a user's approach; a power supply means; and a microcontroller for operating the sterilization means at a predetermined period while the cover is closed and controlling the opening and closing of the opening and closing means.

In this way, the above registered Korean Patent provides an effect in that the inside of the garbage can is sterilized and deodorized to be able to prevent the occurrence of odors, and the cover of the garbage can is automatically opened according to the user's approach and automatically closed after a certain period of time, thereby making it convenient for a user to throw garbage into the garbage can.

However, in the above registered Korean Patent, even though the garbage can prevents the occurrence of odors by repeated operation of the sterilization means, when food waste and the like are disposed, complete internal sterilization and deodorization are difficult, and in particular, when a large amount of garbage is loaded, the garbage can is unable to completely prevent the decay of garbage through the sterilization means, so the effect of preventing the occurrence of odors is insufficient.

Accordingly, when considering that the occurrence of odors cannot be completely prevented, another alternative has been to prevent odors inside the garbage can from leaking to the outside.

Meanwhile, in a configuration of the above registered Korean Patent, since the odors generated from inside the garbage bag leak into a gap between the basket covered with the garbage bag and an inlet of garbage, it is insufficient for the configuration to be able to prevent the leakage of such odors, and thus, there is a problem with a limitation in preventing odor leakage by using only general packing.

DISCLOSURE

Technical Problem

Accordingly, the present invention is devised to solve the above problems.

An objective of the present invention is to provide a garbage can provided with an airtight means for preventing odor leakage, wherein an inner basket covered with a garbage bag is in close contact with an airtight part of an upper cap, so as to prevent odors generated from garbage in the garbage bag from leaking into a gap between the upper cap and the inner basket, and when a user replaces the garbage bag or collects the garbage, the inner basket is raised and pressurized automatically only by opening and closing a side cover of the garbage can without any separate operation, thereby relieving discomfort or inconvenience caused by the odors during use of the garbage can.

Technical Solution

In order to achieve the above-described objective, a garbage can according to the present invention includes:

a main body provided with a side cover capable of being opened and closed, and an upper cap having an inlet of garbage and an airtight part formed on a lower side along a rim of the inlet;

an inner basket combined to be able to be raised and lowered in the main body, and provided with a side wall part that forms upper and lower openings and is covered with a garbage bag; and an airtight means for preventing odor leakage, the airtight means interlocking with the side cover when the side cover is closed, raising the inner basket, and adhering an upper end of the side wall part covered with the garbage bag to the airtight part.

In addition, in the garbage can according to the present invention, the airtight means may include a pressurizing member coupled to be movable back and forth in the main body and pressurizing the inner basket to be raised during a moving-forward operation.

In addition, in the garbage can according to the present invention, the airtight means may include a pair of pressurizing members coupled to each other to be movable back and forth by interlocking with each other in the main body, so that the inner basket is pressurized and raised during the moving-forward operation of the pressurizing members.

In addition, in the garbage can according to the present invention, the side cover may be able to be opened and closed in a forward and backward movement direction of the pressurizing member, and the pressurizing member may include a protruding end that protrudes toward the side cover, so that the side cover pushes the protruding end of the pressurizing member to move the pressurizing member forward when the side cover is closed.

Advantageous Effects

A garbage can provided with an airtight means for preventing odor leakage according to the present invention has the following effects.

An inner basket covered with a garbage bag is in close contact with an airtight part of an upper cap, so despite an operation of a sterilization means and the like, when odors are generated by garbage inside the garbage can, the odors are prevented from leaking to the outside of the garbage can, thereby relieving discomfort or inconvenience caused by the odors during use.

In particular, when replacing the garbage bag or collecting the garbage by a user, the inner basket is automatically lowered by opening a side cover, and the inner basket is automatically raised by closing the side cover, thereby maintaining airtightness to provide convenience of use.

The operation structure for raising the inner basket through forward movement of a pressurizing member is simplified, so that it is possible to secure manufacturing convenience and reduce manufacturing cost.

In addition, the risk of failure may be reduced due to stable support of the inner basket and smooth height change through the raising and lowering of the inner basket.

DESCRIPTION OF THE MAIN NUMERALS IN THE DRAWINGS

Figure 1:
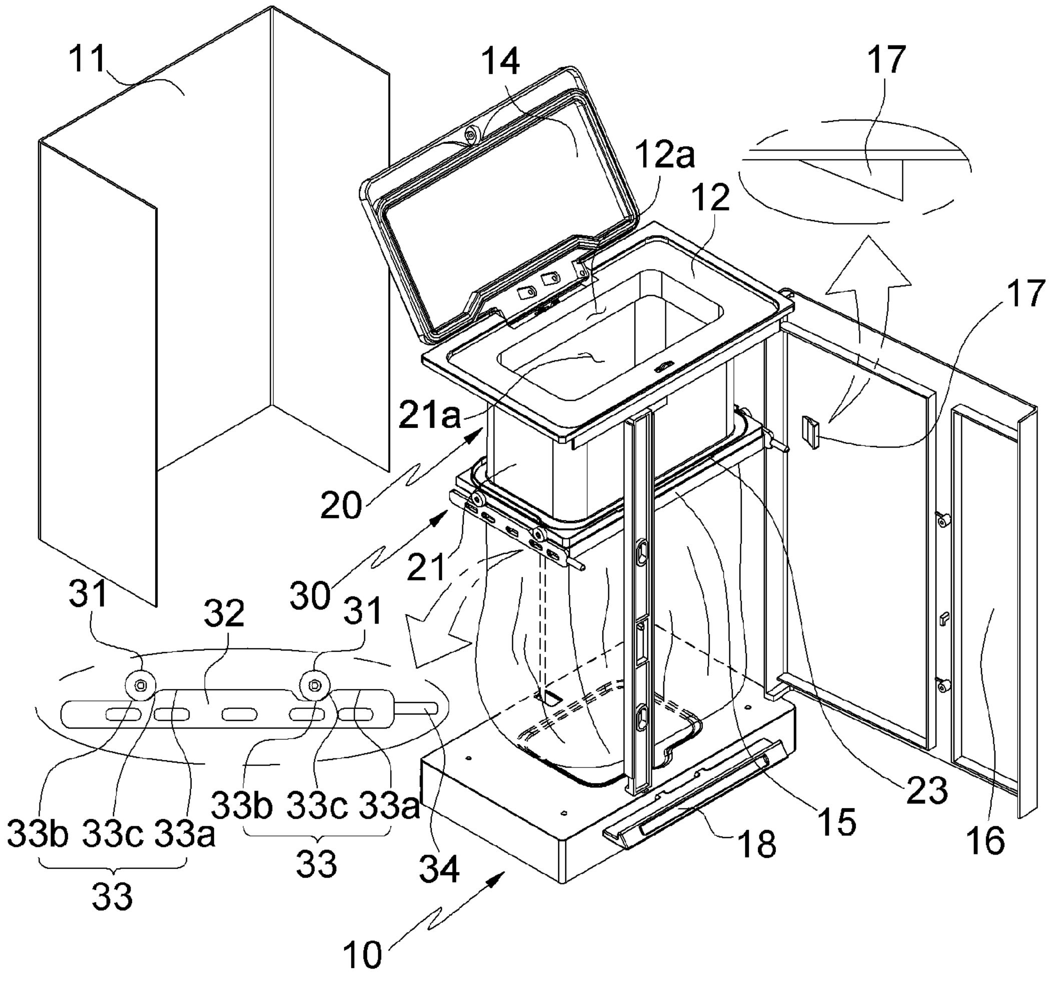
FIG. 1 is a perspective view showing a first exemplary embodiment of a garbage can according to the present invention.
Figure 2A:
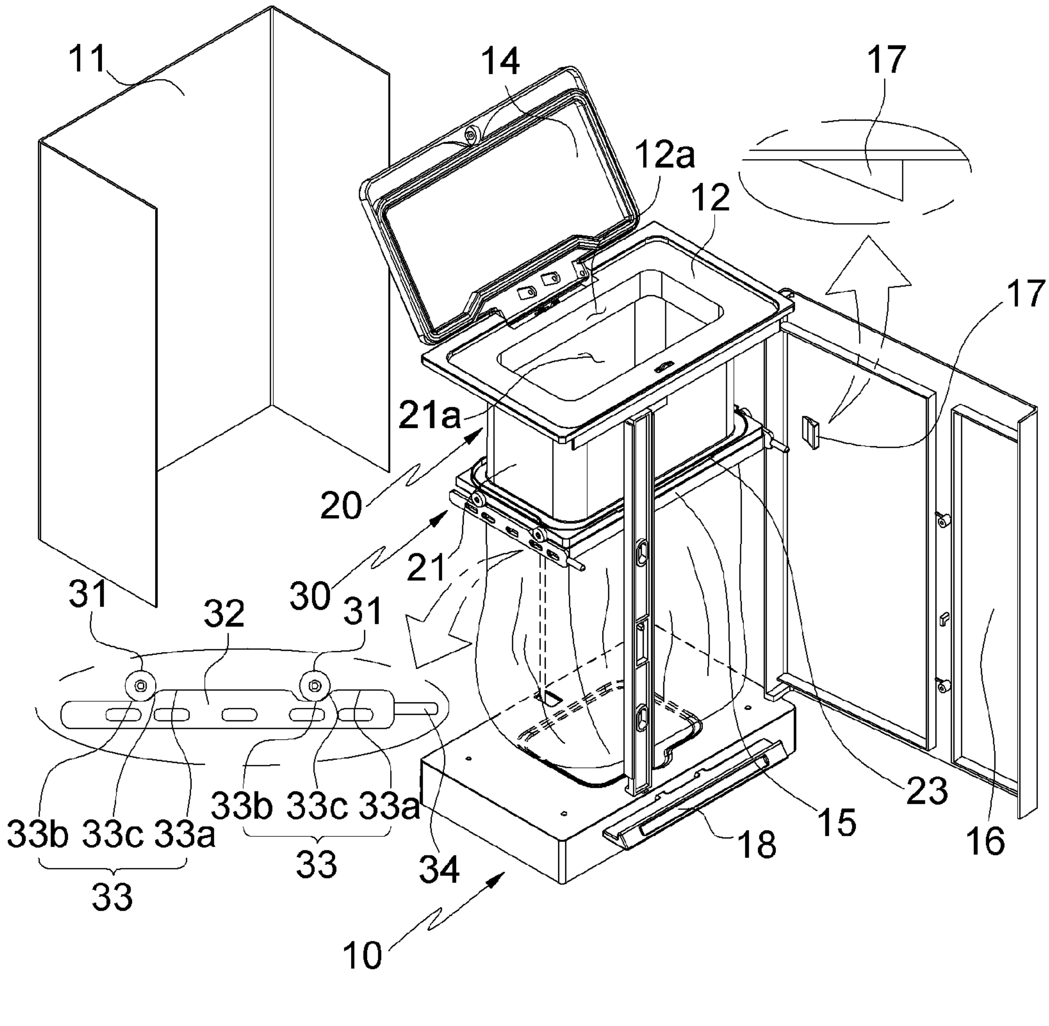
FIGS. 2A and 2B are a side view of a main part showing a first exemplary embodiment of an airtight means according to the present invention.
Figure 2B:
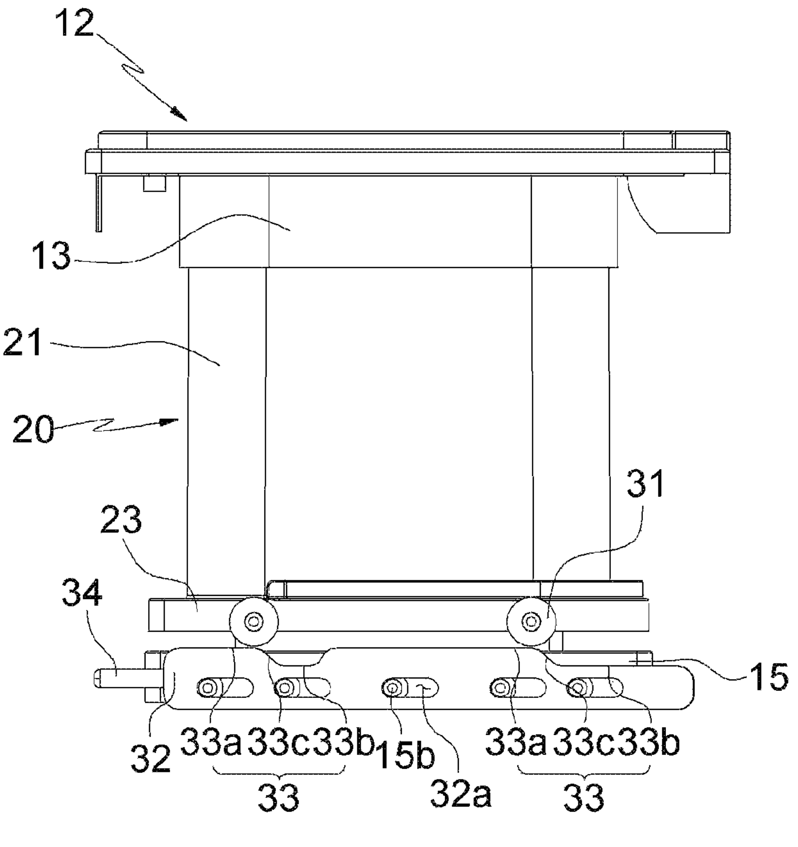
Figure 3A:
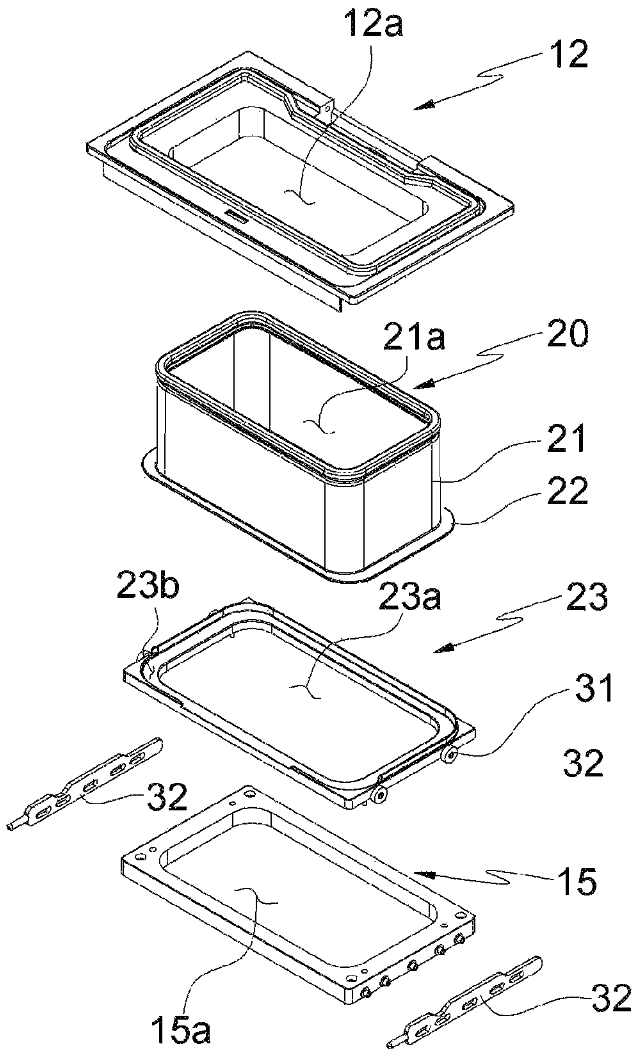
FIGS. 3A and 3B are an exploded perspective view of the main part showing the first exemplary embodiment of the airtight means according to the present invention.
Figure 3B:
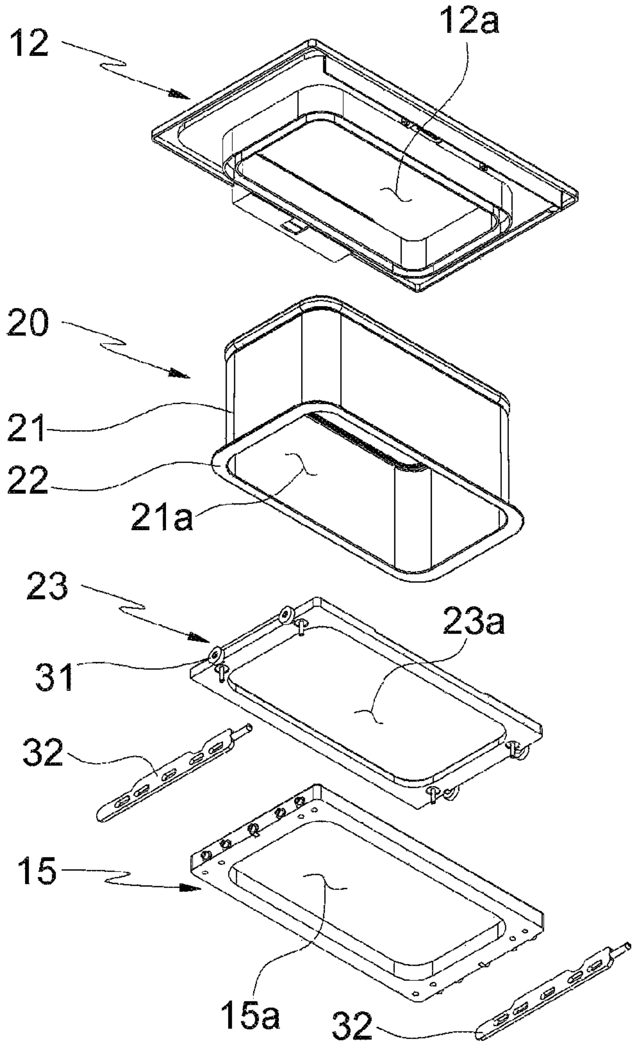

10: main body 11: case
12: upper cap 12*a*: inlet
13: airtight part 14: cover
15: support plate 15*a*: passing part
15*b*: guide part 16: side cover
17: pressurizing end 18: footrest part
20: basket 21: side wall
21*a*: opening 22: flange part
23: raising and lowering plate 23*a*: penetration part
23*b*: fitting part 30, 130: airtight means
31, 131A, 131B: pressurized part 32, 132A, 132B: pressurizing member
32*a*, 132*a*: sliding groove 33, 133: pressurizing part
33*a*, 133*a*: upper horizontal plane 33*b*, 133*b*: lower horizontal plane
33*c*, 133*c*: sloped surface 34, 134: protruding end
135: rack gear part 35*a*: toothed part
136: interlocking gear

BEST MODE

In the present invention, various changes can be made and various forms can be obtained, and exemplary embodiments (i.e., aspects or examples) will be described in detail in the specification. However, this is not intended to limit the present invention to a particular disclosed form. On the contrary, the present invention is to be understood to include all various alternatives, equivalents, and substitutes that may be included within the spirit and technical scope of the present invention.

Figure 4:
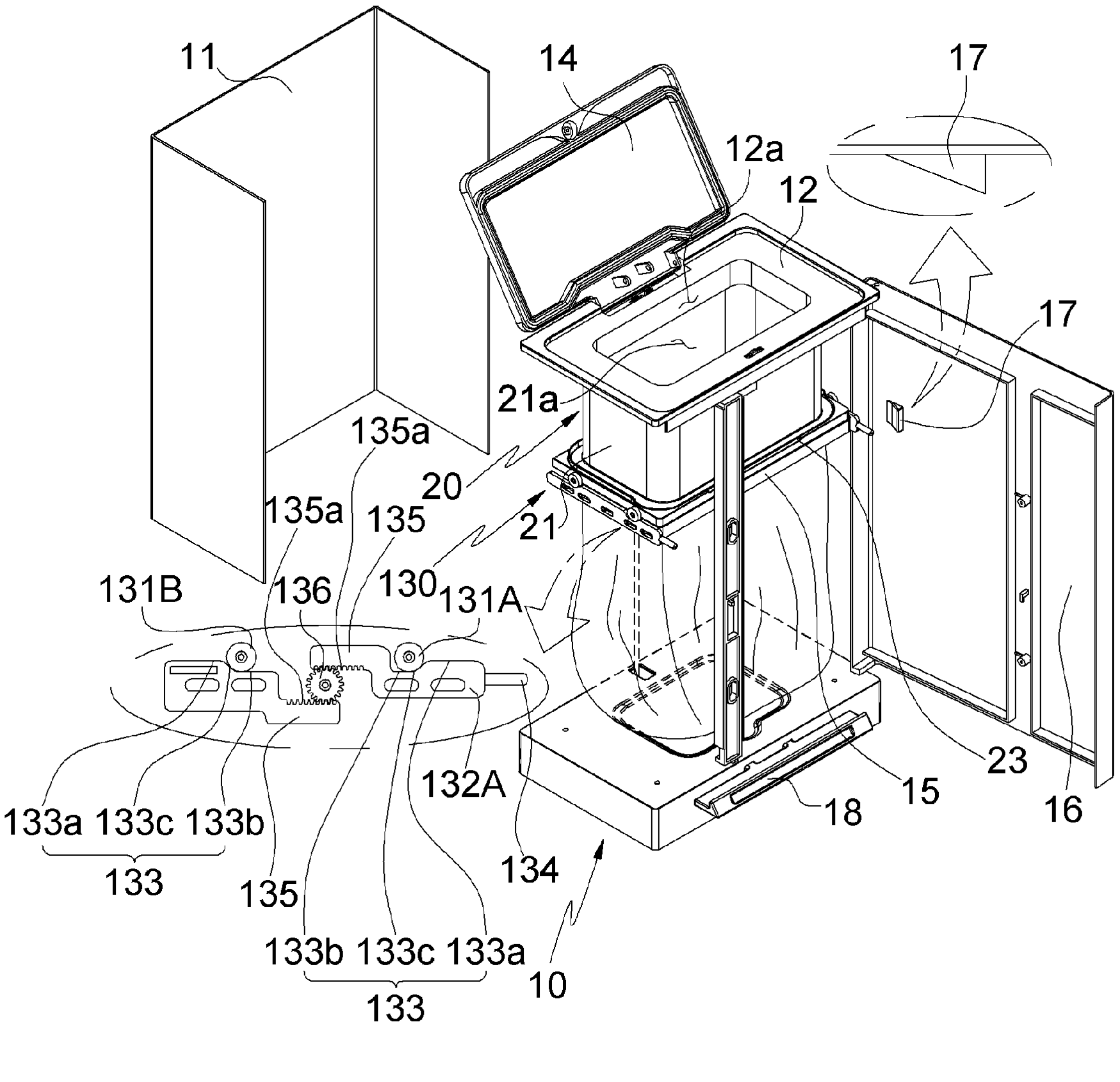
FIG. 4 is a perspective view showing a second exemplary embodiment of the garbage can according to the present invention.
Figure 5A:
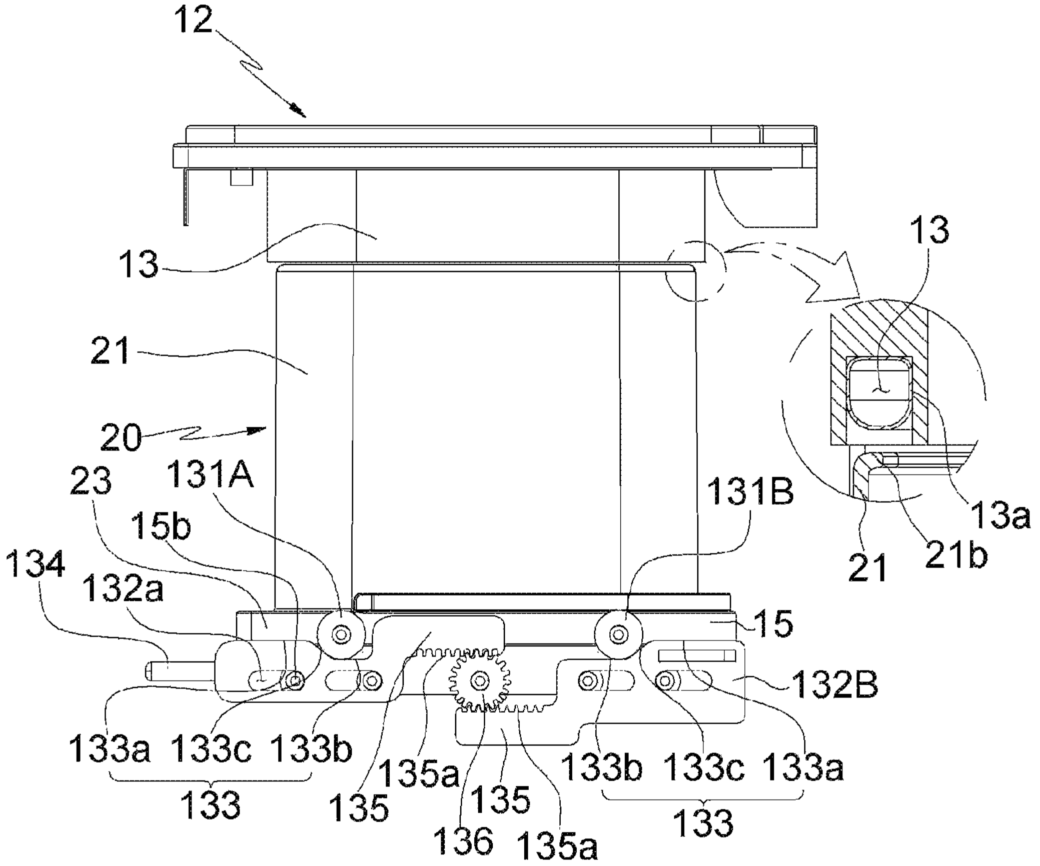
FIGS. 5A and 5B are a side view of the main part showing a second exemplary embodiment of the airtight means according to the present invention.
Figure 5B:
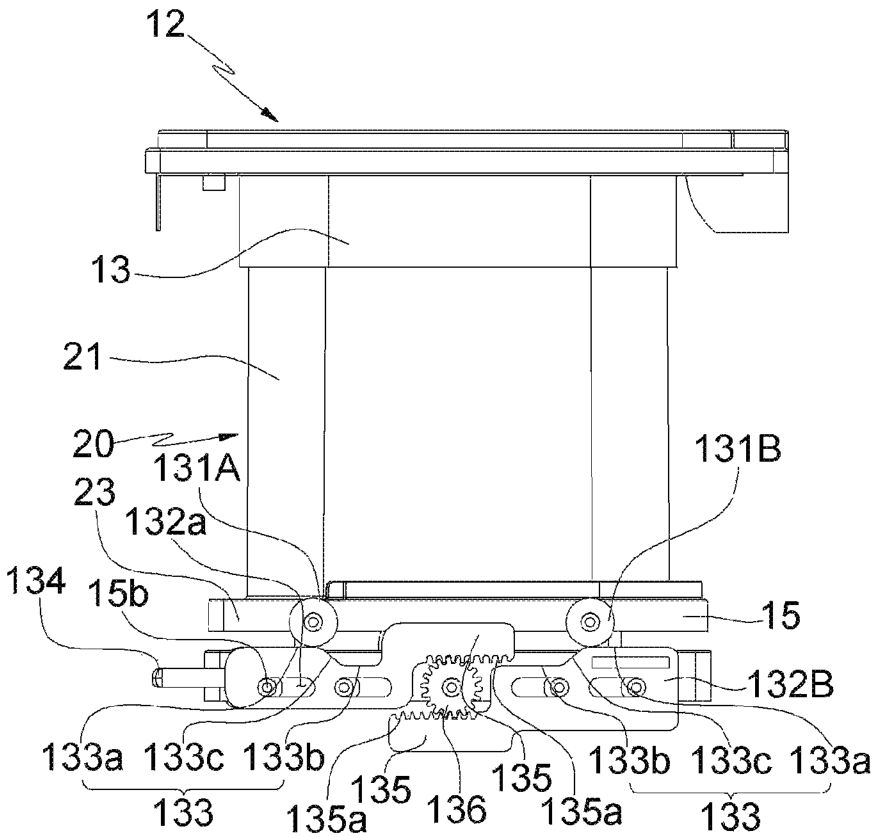
Figure 6A:
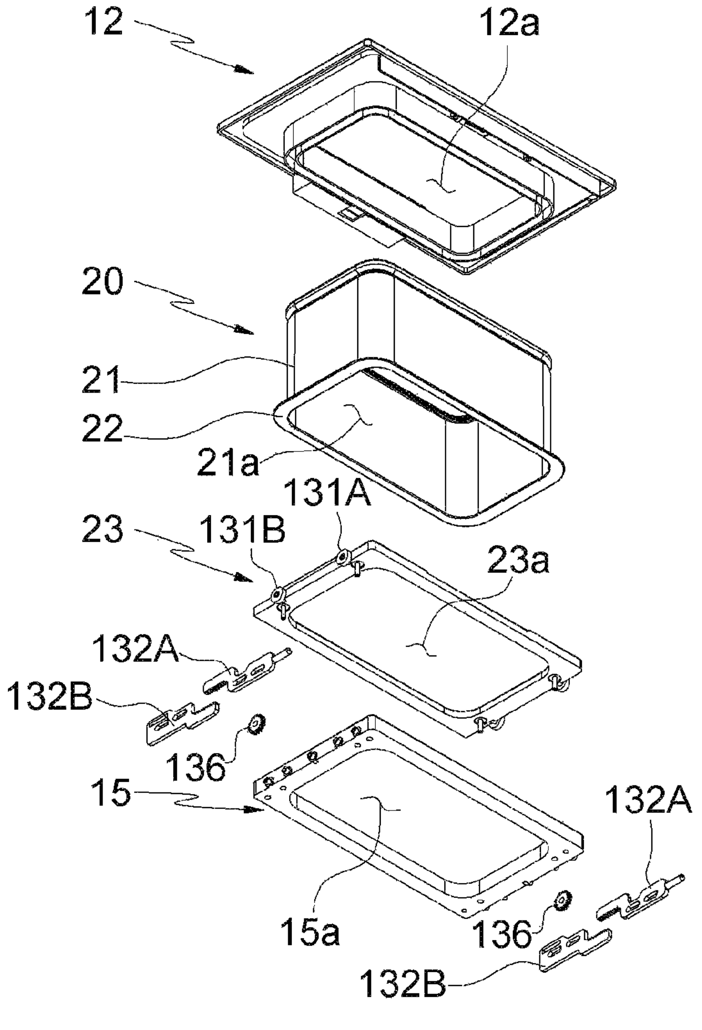
FIGS. 6A and 6B are an exploded perspective view of the main part showing the second embodiment of the airtight means according to the present invention.
Figure 6B:
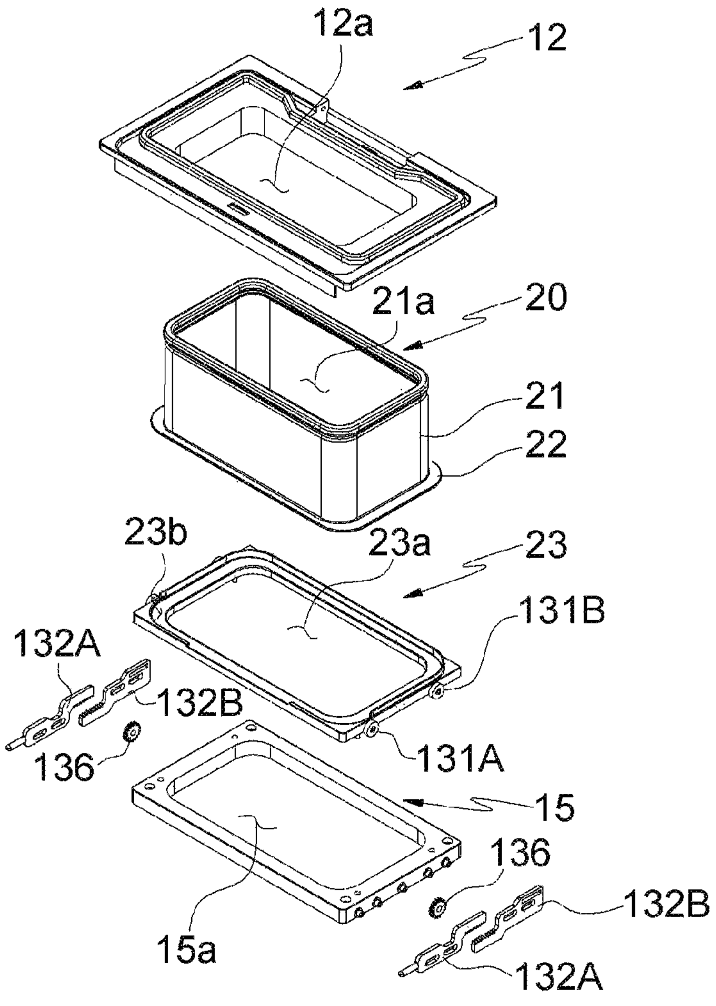

In describing a garbage can provided with an airtight means for preventing odor leakage according to the present invention, for convenience, when specifying an approximate rough direction standard with reference to FIGS. 1 and 4, a direction in which gravity acts is set as a lower side, and a visible direction, as it is, is set as each of the up, down, left, and right directions on the basis of the direction facing the front side provided with a footrest part of a pressurizing panel. In addition, in the detailed description and claims related to the other drawings as well, unless otherwise specified, directions are specified and described in accordance with this standard.

Hereinafter, a garbage can provided with an airtight means for preventing odor leakage according to the present invention will be described with reference to the accompanying drawings.

As shown in FIGS. 1 to 6, the garbage can according to the present invention includes: a main body 10 forming an outer case 11; an inner basket 20 on which a garbage bag is mounted inside the main body 10; and an airtight means 30 and 130 for preventing odor leakage by closely contacting the inner basket 20 with an upper cap 12 of the main body 10.

In particular, the main body 10 is provided with the inner basket 20 at the inner upper end of the outer case 11 so that the garbage bag may be mounted thereon. In the drawings of the present specification, exemplary embodiments are shown representatively, wherein a garbage pouch that is usable as a garbage bag is fitted on the outer surface of the inner basket 20, the garbage pouch is covered so as to be released inward the basket 20, a lower end of the garbage pouch is tied and used, and then the garbage pouch is cut and discharged when filled with garbage.

When the main body 10 having the above configuration is used, there is no need to replace the garbage bag each time by putting a new garbage bag inside the main body 10, and the garbage pouch may be cut and discharged depending on the amount of garbage, thereby providing great convenience.

However, the main objective of the present invention is to prevent leakage of odors by filling a gap between the inner basket 20 covered with a garbage pouch and the upper cap 12 on which the inlet 12*a* of garbage is formed, whereby the detailed configuration of the main body 10 may be provided differently such that a new garbage bag, like a recycling garbage bag, may cover the inner basket 20 and be placed thereon for use.

Hereinafter, for convenience of explanation, a garbage bag, represented in the drawings, is collectively referred to as a garbage pouch.

Specifically, the main body 10 includes: an upper cap 12 having an inlet 12*a* of garbage and an airtight part 13 formed on a lower side thereof along a rim of the inlet 12*a*.

The upper cap 12 may further include an inner cover that is opened and closed so as to double seal the inlet 12*a* of garbage from the inside, in addition to an outer cover 14 covering the upper side of the outer case 11, and opening and closing the inlet 12*a* of garbage.

The airtight part 13 has a shape of a groove with an open lower end, and has a width of the groove in consideration of the thickness of the inner basket 20 and a garbage pouch (or a new garbage bag) covered on the inner basket 20. It is preferable that a packing 13*a* made of synthetic resin, such as a rubber or silicone, is additionally provided inside the airtight part 13.

Such an upper cap 12 may be coupled to the upper end of the outer case 11 of the main body 10, and may also be coupled to a support bar (not shown) installed on an inner rim of the outer case 11 for stable support of the upper cap 12.

In addition, the main body 10 includes a side cover 16 capable of opening and closing in the forward and backward movement direction of a second and third pressurizing members 132A and 132B, which will be described later.

One end of the side cover 16 is hingedly coupled to the main body 10 to open and close in a casement method, and includes a pressurizing end 17 formed to be inclined downward in one direction and protruding, from an inner side surface of the side cover 16, at a position corresponding to each of first and second protruding ends 34 and 134 of the first and second pressurizing members 32 and 132A, to be described later.

When the side cover 16 is closed, the pressurizing end 17 pushes each of the first and second protruding ends 34 and 134 of the first and second pressurizing members 32 and 132A inward, whereby the inner basket 20 is raised through operation of the airtight means 30 and 130.

The inner basket 20 includes a side wall part 21 coupled to be raised and lowered inside the main body 10, provided with upper and lower openings 21*a* formed in the inner basket 20, and covered with a garbage pouch.

The side wall part 21 is provided with a compressing part 21*b* bent inward at the upper end thereof, and the compressing part 21*b* is fitted to a groove-shaped airtight part 13 to closely adhere to the inner packing 13*a*.

In order to support the inner basket 20, a support plate 15 is provided at a predetermined height of the inner upper end of the main body 10, and is formed with a passing part 15*a* for a garbage bag, the passing part 15*a* having a size corresponding to the opening 21*a* of the inner basket 20 and passing through the upper and lower sides of the support plate 15.

In addition, the inner basket 20 is provided with a flange part 22 protruding outward along a rim of the lower opening 21*a*.

The inner basket 20 includes a raising and lowering plate 23 having a shape and an area corresponding to the support plate 15, is provided with a penetration part 23*a* for penetrating vertically to communicate with the openings 21*a* and the passing part 15*a*, and is provided with a fitting part 23*b* to which the flange part 22 is fitted and coupled on the upper side of a rim of the penetration part 23*a*.

Accordingly, the inner basket 20 coupled to the upper side of the raising and lowering plate 23 is raised and lowered while seated on the upper side of the support plate 15.

Such an inner basket 20 is slidably coupled to a guide bar (not shown) installed upright passing through the support plate 15, so as to guide the raising and lowering of the inner basket 20.

Subsequently, each of the airtight means 30 and 130 for preventing odor leakage raises the inner basket 20 so that the upper end of the side wall part 21 covered with a garbage pouch is in close contact with the airtight part 13.

First, the first airtight means 30 includes a pressurizing member that is coupled to be movable back and forth inside the main body 10 to pressurize and raise the inner basket 20 during forward movement operation.

Specifically, the first airtight means 30 includes:

a first pressurized part 31 provided on each opposite side of the inner basket 20; and each of first pressurizing members 32 which is in surface contact with a lower end of the first pressurized part 31, is coupled to the lower end of the first pressurized part 31 to be movable back and forth inside the main body 10, and is provided with a first pressurizing part 33 composed of a first upper horizontal surface 33*a* and a first lower horizontal surface 33*b*, which are connected to each other so that each upper side has a height different from each other, and a first inclined surface 33*c* obliquely connecting the first upper and lower horizontal surfaces 33*a* and 33*b* to each other.

Accordingly, when the first pressurizing member 32 moves forward, the first pressurized part 31 moves along the first inclined surface 33*c* to be supported by the first upper horizontal surface 33*a*, so that the inner basket 20 is raised.

Then, when the first pressurizing member 32 moves backward, the first pressurized part 31 is supported by the first lower horizontal surface 33*b*, so that the inner basket 20 is lowered.

The first pressurized part 31 is provided to protrude from each opposite side of the inner basket 20, and such a first pressurized part 31 is composed of a support roller axially installed on and coupled to the opposite side of the inner basket 20 so as to be rotatable back and forth.

It is preferable that two or more support rollers arranged back and forth are provided on each side of the inner basket 20, more precisely, the raising and lowering plate 23.

The first pressurizing member 32 is a bar type member, and includes a first sliding groove 32*a* to which a guide part 15*b* protrudingly coupled to each of the opposite sides of the support plate 15 is fitted and slidably coupled, wherein corresponding to each support roller arranged back and forth, a pair of first pressurizing parts 33 arranged back and forth and composed of the first upper and lower horizontal surfaces 33*a* and 33*b* and the first inclined surface 33*c* is provided on the upper side of the first pressurizing member 32.

It is apparent that the number of the support rollers and the number of the first pressurizing parts 33 may vary.

In the first pressurizing part 33, the first lower horizontal surface 33*b* in a groove shape is downwardly connected to the first upper horizontal surface 33*a*, so as to be connected to the first inclined surface 33*c* inclined in a streamlined shape while having a predetermined angle between the first upper and lower horizontal surfaces 33*a* and 33*b*.

Meanwhile, the side cover 16 may be opened and closed in the forward and backward movement direction of the first pressurizing member 32.

The first pressurizing member 32 includes a first protruding end 34 protruding in the direction of the side cover 16.

Accordingly, when the side cover 16 is closed, the side cover 16 pushes the first protruding end 34 of the first pressurizing member 32 to move the first pressurizing member 32 forward.

One end of the side cover 16 is hingedly coupled to the main body 10 to be opened and closed in a casement method, and when the side cover 16 is closed, the first pressurizing member 32 moves forward.

In this case, the side cover 16 includes a pressurizing end 17 that protrudes from an inner side surface to a position corresponding to the first protruding end 34 and is formed inclined downward in one direction.

In this case, although not shown in the drawing, the pressurizing end 17 and the first protruding end 34 may be provided to be detachably connected to each other by a one-touch method, or to be detachable in a method such as male and female coupling or engaging coupling.

Accordingly, when a user opens the side cover 16 for replacement of a garbage bag or collection of garbage, the first pressurizing member 32 automatically moves backward and the inner basket 20 is lowered.

When the user closes the side cover 16 after the replacement of the garbage bag or completion of garbage collection, the first pressurizing member 32 automatically moves forward and the inner basket 20 is raised, thereby preventing leakage of odors through enhanced airtightness.

In this way, the raising and lowering of the inner basket 20 through the side cover 16 is automatically performed, so that the user may easily and conveniently use the garbage can without a separate operation for maintaining airtightness.

The pressurizing end 17 has a planar shape of a right triangle formed to be inclined upward from an axial part side of the side cover 16 to the inner side thereof, and in particular, it is preferable for the pressurizing end 17 to be provided in a position corresponding to the first protruding end 34 adjacent to the axial part of the side cover 16.

The reason why the pressurizing end 17 makes it possible to pressurize the first protruding end 34 adjacent to the axial part of the side cover 16 is explained as follows:

In a case of the side cover 16 in a casement method, since a rotation distance of one end of the side cover 16 provided with the axial part and a rotation distance of the other end opposite to the axial part are different from each other, the other end of the side cover 16 is closed while rotating in an arc shape with a wide radius, so that the inner side surface of the side cover 16 contacts the first protruding end 34 in a direction substantially perpendicular to the first protruding end 34, thereby causing no scratching by the first protruding end 34. Whereas, since one end of the side cover 16 has a short rotation distance, the first protruding end 34 contacts the inner side surface of the side cover 16 in a diagonal direction, whereby the risk of being scratched by the first protruding end 34 is high, and thus, the present invention aims to prevent scratching by arbitrarily changing the contact angle between the first protruding end 34 and the side cover 16 through the right triangle-shaped pressurizing end 17.

In addition, as shown, the garbage can of the present invention preferably has a structure in which the cover 14 is automatically opened and closed through the pressurizing of the footrest part 18, and there are no restrictions on a method of interlocking operation of the footrest part 18 and the cover 14.

Hereinafter, the operation of the first airtight means 30 according to the present invention with this configuration is described in detail.

First, when the side cover 16 is opened for detachment or replacement of a garbage pouch and the like, the first pressurizing member 32 automatically moves backward in the opened direction of the main body 10 without any additional operation.

In this case, the moving backward of the first pressurizing member 32 may be performed by a user directly pulling the first protruding end 34 by hand, but in order to improve convenience of use, there are alternatives in which the side cover 16 and the first pressurizing member 32 are connected to each other in a one-touch method so as to be detachable, or are provided to be detachable in a method of male and female coupling, engaging coupling, etc., or through an additional installation of a spring that elastically supports the first pressurizing member 32 in the backward direction, the first pressurizing member 32 may be allowed to move backward automatically when the side cover 16 is opened.

In this way, when the first pressurizing member 32 moves backward, while rotating, the first pressurized part 31, that is, the support roller, supported on the first upper horizontal surface 33*a* is lowered to the first lower horizontal surface 33*b* by moving along the first inclined surface 33*c* and is supported thereon, so that the upper end of the inner basket 20 is separated from the airtight part 13 which is in a form of a groove, whereby the inner basket 20 is detachable.

In addition, after the garbage pouch is installed or replaced, when the inner basket 20 is mounted on the support plate 15 and then the side cover 16 is closed, while sequentially contacting each of the first protruding ends 34, the pressurizing end 17 and the inner side surface of the other side of the side cover 16 respectively move forward and push the first pressurizing members 32.

In this way, when the first pressurizing member 32 moves forward, the support roller supported on the first lower horizontal surface 33*b* is supported in a state of being raised to the first upper horizontal surface 33*a* by moving along the first inclined surface 33*c*, and accordingly, as the entire inner basket 20 is raised, the upper end of the basket 20 enters the airtight part 13 and is in close contact with the inner side of the airtight part 13, so that the gap between the inner basket 20 and the upper cap 12 is tightly sealed, whereby it is possible to prevent odors, generated from inside the garbage can, from leaking to the outside of the garbage can during use.

Next, the second airtight means 130 includes a pair of second and third pressurizing members 132A and 132B coupled to each other so as to be movable back and forth by interlocking with each other in the main body 10, wherein the inner basket 20 is pressurized and raised during the moving-forward operation of the second and third pressurizing members 132A and 132B.

Specifically, each of the second and third pressurizing members 132A and 132B is provided with a second pressurizing part 133 composed of a second upper horizontal surface 133*a* and a second lower horizontal surface 133*b*, which are connected to each other so that each upper side has a height different from each other, and a second inclined surface 33*c* obliquely connecting the second upper and lower horizontal surfaces 133*a* and 133*b* to each other. Each of the rack gear parts 135 having a toothed part 135*a* is provided vertically and spaced apart from each other at a predetermined interval on an inner side surface where the second and third pressurizing members 132A and 132B are in contact with each other.

The second airtight means 130 includes: a pair of second pressurized parts 131A and 131B provided back and forth on each of opposite sides of the inner basket 20 so as to make surface contact with each of the second pressurizing parts 133 of the second and third pressurizing members 132A and 132B; and an interlocking gear 136 engaged between each of rack gear parts 135 of the second and third pressurizing members 132A and 132B, so as to be coupled thereto and rotatable back and forth.

When the second and third pressurizing members 132A and 132B move inward, the second pressurized parts 131A and 131B move along the second inclined surface 133*c* and are supported on the second upper horizontal surface 133*a*, so that the inner basket 20 is raised.

Whereas, when the second and third pressurizing members 132A and 132B move outward, the second pressurized parts 131A and 131B are supported by the second lower horizontal surface 133*b*, so that the basket 20 is lowered.

The second pressurized parts 131A and 131B are provided to respectively protrude from opposite sides of the inner basket 20, and the second pressurized parts 131A and 131B are respectively composed of support rollers that are axially installed on and coupled to opposite sides of the inner basket 20, so as to be rotatable back and forth.

Such two or more support rollers arranged back and forth are provided on each side of the inner basket 20, more precisely, the raising and lowering plate 23.

Each of the second and third pressurizing members 132A and 132B is a bar-type member having a shape corresponding to each other, and includes a second sliding groove 132*a* to which a guide part 15*b* protrudingly coupled to each of the opposite sides of the support plate 15 is fitted and slidably coupled, wherein each of the second and third pressurizing members 132A and 132B is provided arranged back and forth and provided with a second pressurizing part 133 having an upper side thereof where the second upper and lower horizontal surfaces 133*a* and 133*b* and the second inclined surface 133*c* are composed in correspondence with each of the second pressurized parts 131A and 131B arranged back and forth, that is, the support roller.

In this case, the second and third pressurizing members 132A and 132B are respectively provided with rack gear parts 135 each having inner end thereof protruding at a different vertical height to be connected to each other, and the lower and upper sides of each rack gear part 135 is provided with a toothed part 135*a* in the longitudinal direction.

In the second pressurizing part 133, the second lower horizontal surface 133*b* is connected to the lower side of the second upper horizontal surface 133*a* in a groove shape, so that the second upper and lower horizontal surfaces 133*a* and 133*b* are connected to a second inclined surface 133*c* inclined in a streamlined shape while having a predetermined angle.

The interlocking gear 136 is axially installed in the center of opposite sides of the support plate 15 and rotates back and forth, and is provided with a gear teeth capable of engaging with each of the toothed parts 135*a* on the outer circumferential surface, so that when one pressurizing member 132A moves forward and backward, driving force is transmitted to the other pressurizing member 132B while rotating together, whereby the second and third pressurizing members 132A and 132B interlock with each other to move forward and backward together.

In addition, the second pressurizing member 132A provided toward a direction of the side cover 16 includes a second protruding end 134 protruding in the direction of the side cover 16.

Accordingly, when the side cover 16 is closed, the second protruding end 134 of the pressurizing member 132A is pushed so that the second and third pressurizing members 132A and 132B are interlocked with each other to move forward.

Therefore, when a user opens the side cover 16 for replacement of a garbage bag or collection of garbage, the inner basket 20 is lowered while the second and third pressurizing members 132A and 132B automatically move backward.

Whereas, when the user closes the side cover 16 after the replacement of the garbage bag or the completion of garbage collection, the inner basket 20 is raised while the second and third pressurizing members 132A and 132B automatically moves forward, thereby preventing leakage of odors by means of enhanced airtightness.

In this way, the raising and lowering of the inner basket 20 through the side cover 16 are automatically performed, so that the user may easily and conveniently use the garbage can without a separate operation for maintaining the airtightness.

In the second exemplary embodiment as well, it is preferable that the pressurizing end 17 is provided at a position corresponding to the second protruding end 134 adjacent to the axial part.

Hereinafter, the operation of the second airtight means 130 according to the present invention having this configuration is described.

First, when the side cover 16 is opened for detachment or replacement of a garbage pouch and the like, each of the second and third pressurizing members 132A and 132B automatically moves backward in the forward and backward direction of the main body 10 without any additional operation.

In this case, the moving backward of the second and third pressurizing members 132A and 132B may be performed by directly pulling the second protruding end 134 by a user's hand, but in order to improve convenience of use, there are alternatives in which the side cover 16 and the second and third pressurizing members 132A and 132B are connected to each other in a one-touch method so as to be detachable, or are provided to be detachable in a method of male and female coupling, engaging coupling, etc., or through an additional installation of a spring that elastically supports the second and third pressurizing members 132A and 132B in the backward direction, the second and third pressurizing members 132A and 132B may be allowed to move backward automatically when the side cover 16 is opened.

In this way, when the second and third pressurizing members 132A and 132B move backward, while rotating, the pressurized part 131, that is, the support roller, supported on the second upper horizontal surface 133*a* of the second pressurizing part 133 is lowered to the second lower horizontal surface 133*b* by moving along the second inclined surface 133*c* and is supported thereon, so that the upper end of the inner basket 20 is separated from the airtight part 13 in the form of a groove, whereby the inner basket 20 is detachable.

In addition, after the garbage pouch is installed or replaced, when the inner basket 20 is mounted on the support plate 15 and then the side cover 16 is closed, the pressurizing end 17 and the inner side surface of the other side of the side cover 16 move forward by pushing the second pressurizing member 132A while contacting each of the second protruding ends 134 in sequence, and accordingly, as the interlocking gear 136 rotates, the second pressurizing member 132B moves forward in a direction opposite to the second pressurizing member 132A.

When the second and third pressurizing members 132A and 132*b* move forward, the support roller supported on the second lower horizontal surface 133*b* of the second pressurizing part 133 is supported in a state of being raised to the second upper horizontal surface 133*a* by moving along the second inclined surface 133*c*, and accordingly, as the entire inner basket 20 is raised, the upper end of the basket 20 enters the airtight part 13 and is in close contact with the inner side of the airtight part 13, so that the gap between the inner basket 20 and the upper cap 12 is tightly sealed, whereby it is possible to prevent the odors generated from inside the garbage can from leaking to the outside of the garbage can during use.

In the present invention provided with the first and second airtight means 30 and 130 of the above configuration, a user does not need to add a separate operation to prevent odor leakage, and the airtightness is reinforced and maintained while the inner basket 20 is raised and lowered only by the opening and closing of the side cover 16, thereby providing great convenience of use.

Furthermore, when the packing 13*a* is fitted to the airtight part 13 in a groove shape, the adhesion of the inner basket 20 is maintained more strongly, so as to improve airtightness, thereby completely blocking the leakage of odors to the outside.

In the above description of the present invention, the garbage can is provided with an airtight means for preventing odor leakage has been described with reference to the accompanying drawings. However, the present invention can be variously modified, changed, and substituted by those skilled in the art, and such modifications, changes, and substitutions should be interpreted as falling within the protective scope of the present invention.

The invention claimed is:

1. A garbage can comprising:

a main body provided with a side cover capable of being opened and closed, and an upper cap having an inlet of garbage and an airtight part formed on a lower side along a rim of the inlet;

an inner basket combined to be able to be raised and lowered in the main body, and provided with a side wall part that forms upper and lower openings and is covered with a garbage bag; and an airtight means for preventing odor leakage, the airtight means interlocking with the side cover when the side cover is closed, being configured to raise the inner basket, and being configured to adhere an upper end of the side wall part covered with the garbage bag to the airtight part.

2. The garbage can of claim 1, wherein the airtight means comprises a pressurizing member coupled to be movable back and forth in the main body and pressurizing the inner basket to be raised during a moving-forward operation.

3. The garbage can of claim 2, wherein the side cover is able to be opened and closed in a forward and backward movement direction of the pressurizing member, and the pressurizing member comprises a protruding end that protrudes toward the side cover, so that the side cover pushes the protruding end of the pressurizing member to move the pressurizing member forward when the side cover is closed.

4. The garbage can of claim 1, wherein the airtight means comprises a pair of pressurizing members coupled to each other to be movable back and forth by interlocking with each other in the main body, so that the inner basket is pressurized and raised during the moving- forward operation of the pressurizing members.

5. The garbage can of claim 4, wherein the side cover is able to be opened and closed in a forward and backward movement direction of the pressurizing member, and the pressurizing member comprises a protruding end that protrudes toward the side cover, so that the side cover pushes the protruding end of the pressurizing member to move the pressurizing member forward when the side cover is closed.

* * * * *